F. H. CLOUGH.
SHIP PROPULSION SYSTEM.
APPLICATION FILED JAN. 29, 1921.
1,411,987.
Patented Apr. 4, 1922.
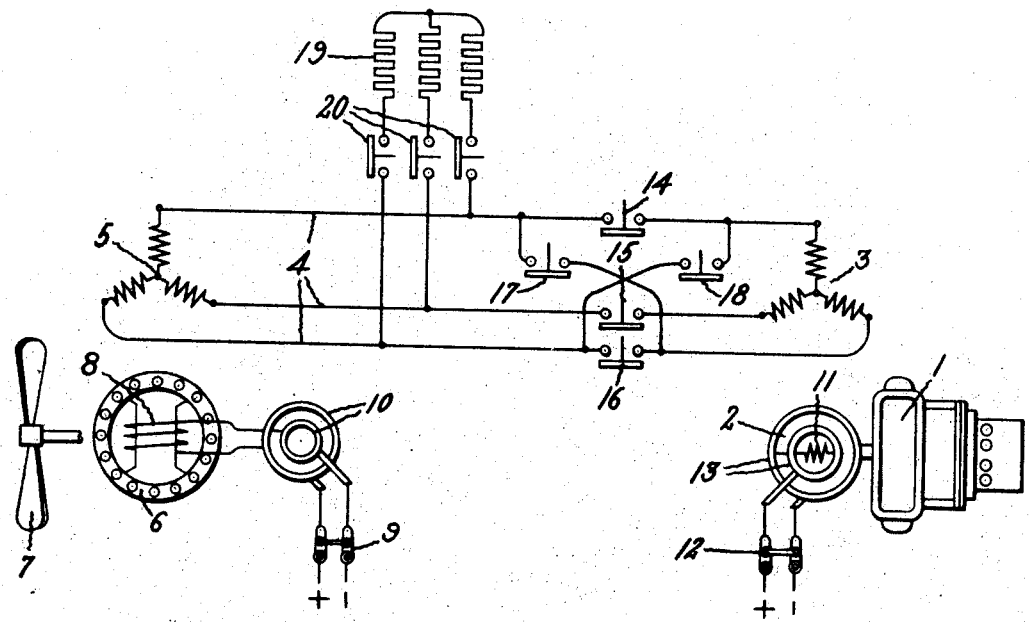
Inventor:
Frederic Horton Clough,
by Albert G. Davis
His Attorney.

UNITED STATES PATENT OFFICE.

FREDERIC HORTON CLOUGH, OF RUGBY, ENGLAND, ASSIGNOR TO GENERAL ELECTRIC COMPANY, A CORPORATION OF NEW YORK.

SHIP-PROPULSION SYSTEM.

1,411,987.      Specification of Letters Patent.     Patented Apr. 4, 1922.

Application filed January 29, 1921. Serial No. 441,030.

*To all whom it may concern:*

Be it known that I, FREDERIC HORTON CLOUGH, a subject of the King of Great Britain, residing at "Hillcrest", Hillmorton, nr. Rugby, in the county of Warwickshire, England, have invented certain new and useful Improvements in Ship-Propulsion Systems, of which the following is a specification.

My invention relates to electric power transmission systems and more particularly to systems in which an alternating current generator driven by an elastic fluid turbine or other prime mover supplies current to a synchronous motor which must be capable of being quickly stopped and started up in the reverse direction. Such a system is particularly applicable to the propulsion of a ship where the synchronous motor is mounted directly upon the propeller shaft.

My invention will be better understood from the following description taken in connection with the accompanying drawing, and its scope will be pointed out in the appended claims.

Referring to the drawing, a prime mover 1 is directly connected to the revolving field member 2 of a synchronous generator whose stator winding 3 is connected through the circuit comprising mains 4 to the stator winding 5 of the propeller driving motor. The rotor 6 of the propeller driving motor is directly connected to the propeller 7. The propeller driving motor is of the synchronous type, excitation being supplied to the field winding 8 from any convenient source of direct current, connected through any suitable controlling switch 9 to slip rings 10. Excitation is supplied to the field winding 11 of the generator from any convenient source of direct current, connected through the controlling switch 12 to the slip rings 13. The prime mover 1 will preferably be an elastic fluid turbine provided with an adjustable speed governor for holding the speed at any desired value. Switches 14, 15, 16, 17 and 18 are provided in the circuit 4 for controlling the connection between the generator and motor and for reversing the phase rotation between generator and motor. It is apparent that one direction of phase rotation is given when switches 14, 15 and 16 are closed and the other direction of phase rotation given when switches 15, 17 and 18 are closed. According to my invention a loading resistance 19 is provided which may be connected across the circuit 4 by switches 20. It is unnecessary to insulate the resistance 19 for high voltages since, according to the method of operation hereinafter set forth, the resistance is connected in circuit only during phases of operation when the voltage is necessarily low. It is obvious that all of the switches shown in the system may be either directly or remotely controlled as desired.

In carrying my invention into effect, when it is desired to reverse from full speed ahead to full speed astern, the steam is first shut off from the turbine 1 and the field circuits of both the synchronous motor and the alternator are deenergized, for example, by opening switches 9 and 12, or by opening the field circuit of the exciter which supplies current to the generator and motor field windings. The main switches 14, 15 and 16 are then opened and switches 15, 17 and 18 closed to reverse the phase rotation between generator and motor. At the same time the loading resistance 19 is connected across the circuit 4 by closing switches 20. The excitation of the alternator and motor fields is then restored. The effect of these operations is that both the alternator and the motor are loaded up on the loading resistance and are quickly brought approximately to standstill. The loading resistance should have a comparatively low value so that at high speeds it acts substantially as a short circuit to both machines. As the speed approaches zero, however, the resistance becomes of an appreciable value and the current tends to flow from one machine directly to another, causing them to synchronize. As soon as this occurs, the load resistance switches 20 are opened and steam is readmitted to the prime mover.

The rotors of both the alternator and the synchronous motor are preferably provided with damping windings, the currents induced in which assist in bringing the machines to rest when they are operating with the phases reversed and also greatly assist in synchronizing the machines.

In the operation just described, it has been assumed that field excitation was restored to the alternator as well as to the motor for dynamic braking. With this method of operation the motor operates as a synchronous motor to reverse the propeller. My invention is not, however, limited to such synchronous reversal, but, on the contrary, is adapted to improve the operation of the system where the propeller is reversed by operating the motor as an induction motor. According to the induction motor method of reversal, when it is desired to reverse from full speed ahead to full speed astern, the steam is first shut off from the turbine and the field circuits of both the motor and alternator are deenergized. The phase rotation between generator and motor is then reversed and the loading resistance 19 connected across the circuit 4. The field of the motor only is then excited to dynamically brake the motor and bring the propeller approximately to standstill. The braking current flows not only through the loading resistance but also through the stator windings of the generator. When the propeller has been brought approximately to standstill, the field circuit of the generator is energized and the field circuit of the motor deenergized. The generator then supplies current to operate the motor as an induction motor to reverse the propeller. When synchronism has been approximately reached in the reverse direction, the field of the motor is reenergized to synchronize the motor with the generator for normal synchronous operation.

What I claim as new and desire to secure by Letters Patent of the United States, is,—

1. The method of braking a ship propulsion system including a prime mover, a synchronous generator driven thereby, a propeller, a synchronous motor for driving said propeller, and a resistance device, which comprises reducing the fluid admission to the prime mover, removing the excitation from generator and motor, connecting the generator and motor in circuit with reversed phase rotation, connecting said resistance device across the circuit between said generator and motor and restoring the excitation to the motor to establish dynamic braking currents through said resistance device to bring said propeller substantially to a standstill.

2. The method of reversing a ship propulsion system including a prime mover, a synchronous generator driven thereby, a propeller, a synchronous motor for driving said propeller, and a resistance device, which comprises reducing the fluid admission to the prime mover, removing the excitation from generator and motor, connecting the generator and motor in circuit with reversed phase rotation, connecting said resistance device across the circuit between the generator and motor, restoring the excitation to the generator and motor to establish dynamic braking currents through said resistance device, then disconnecting said resistance device from circuit and increasing the fluid admission to said prime mover when the generator and motor have synchronized.

3. A ship propulsion system comprising a prime mover, a synchronous generator, a synchronous propeller driving motor arranged to be connected in circuit with said generator, means for controlling the excitation circuits of said generator and motor, means arranged to control the phase rotation between said generator and motor, a loading resistance and means whereby said resistance may be connected across the circuit connecting said generator and motor to establish a dynamic braking circuit for stopping the propeller.

In witness whereof, I have hereunto set my hand this first day of January, 1921.

FRED. H. CLOUGH.

Witnesses:
J. A. FOSTER,
D. WHITE.